(12) United States Patent
Jakobsen et al.

(10) Patent No.: US 6,994,617 B2
(45) Date of Patent: Feb. 7, 2006

(54) FISH FILLETING MACHINE

(75) Inventors: Bjarne Jakobsen, Nibe (DK); Preben Holm Jacobsen, Sæby (DK)

(73) Assignee: Carnitech A/S, Stovring (DK)

( * ) Notice: Subject to any disclaimer, the term of this patent is extended or adjusted under 35 U.S.C. 154(b) by 0 days.

(21) Appl. No.: 10/631,736

(22) Filed: Aug. 1, 2003

(65) Prior Publication Data

US 2004/0087265 A1    May 6, 2004

Related U.S. Application Data

(60) Provisional application No. 60/401,351, filed on Aug. 7, 2002.

(51) Int. Cl.
*A22C 25/16*    (2006.01)

(52) U.S. Cl. ........................ 452/161; 452/160; 452/162

(58) Field of Classification Search ................ 452/150, 452/152, 153, 160, 161, 162, 163, 164
See application file for complete search history.

(56) References Cited

U.S. PATENT DOCUMENTS

| | | | |
|---|---|---|---|
| 1,728,254 A * | 9/1929 | Rieske | 452/161 |
| 1,754,157 A * | 4/1930 | Gallison | 452/161 |
| 1,883,822 A * | 10/1932 | Reid et al. | 452/161 |
| 2,479,010 A | 8/1949 | Jones | |
| 2,738,544 A * | 3/1956 | Stevenson et al. | 452/161 |
| 3,596,308 A | 8/1971 | Kenney | |
| 3,867,740 A * | 2/1975 | Lapine et al. | 452/3 |
| 3,908,230 A * | 9/1975 | Hartmann | 452/135 |
| 4,336,634 A * | 6/1982 | Braeger | 452/135 |
| 4,534,085 A | 8/1985 | Stewart | |
| 4,985,965 A * | 1/1991 | Leavitt | 452/161 |
| 5,149,297 A | 9/1992 | Braeger et al. | |
| 5,286,230 A * | 2/1994 | Nienstedt et al. | 452/170 |
| 5,536,205 A | 7/1996 | Braeger et al. | |
| 6,280,313 B1 * | 8/2001 | Braeger et al. | 452/161 |
| 6,322,437 B1 | 11/2001 | Grabau et al. | |

FOREIGN PATENT DOCUMENTS

| | | |
|---|---|---|
| DE | 2248536 | 4/1974 |
| EP | 0711502 A1 | 5/1996 |

(Continued)

OTHER PUBLICATIONS

International Search Report.

*Primary Examiner*—Peter M. Poon
*Assistant Examiner*—David Parsley
(74) *Attorney, Agent, or Firm*—Harness, Dickey & Pierce, P.L.C.

(57) ABSTRACT

A fish-cutting machine for cutting fillets from the backbone of fish (38), the machine comprising a fish support (6), a feed-line for feeding fish through the machine and two mutually adjacent band saws (46) arranged along the feed-line. The band saws functions to cut on respective sides of the backbone of a fish (38) for filleting the abdomen-bone part of the fish and thus for separating the fish into two fish fillets and a carcass. A spine cutting device is arranged along the feed-line (40) and before the band saws (46) in a feeding direction of the feed-line, and the spine cutting device comprise two mutually adjacent cutting blades (14) for cutting of incisions in the spine part of the fish.

22 Claims, 10 Drawing Sheets

FOREIGN PATENT DOCUMENTS

| | | | |
|---|---|---|---|
| GB | 811199 | | 4/1959 |
| GB | 973213 | | 10/1964 |
| GB | 2089642 | * | 6/1982 |
| JP | 05-304879 | | 11/1993 |
| JP | 6-38671 | * | 2/1994 |
| JP | 06-311838 | | 11/1994 |
| WO | WO 89/10698 | | 11/1989 |
| WO | WO 94/17670 | | 8/1994 |

* cited by examiner

FISH FILLETING MACHINE

This application claims the benefit of provisional application 60/401,351 filed on Aug. 7, 2002.

FIELD OF THE INVENTION

The present invention relates to a machine for cutting fish, in particular to a machine for cutting fillets from the backbones of fish.

BACKGROUND OF THE INVENTION

Fish processing operations typically include removal of the heads and the fish entrails. Subsequently, the fish is split longitudinally and vertically into three pieces, two side-pieces, fish fillets, and one intermediate "carcass" piece containing the backbone. In the following context, the anatomy of the fish will be referred to as follows. The spine part of the fish is the part extending upwardly from the backbone to the upper back of the fish. The abdomen part of the fish is the part extending downward from the backbone to the abdomen or belly. The centre plan is a longitudinally extending vertical plan intersecting through the middle of the backbone in the middle in between the two fillets. The fillets are the pieces of meat arising when the fish is split as described above, i.e. longitudinally and vertically along each sides of the backbone thus splitting the fish into two fillets (side-pieces) and one carcass part comprising the backbone. The carcass is merely used for industrial purposes, e.g. for making fishmeal etc. while the two side-pieces represent the valuable part of the fish and may be further processed, e.g. by smoking.

In general, the process of filleting fish is widely automated. In existing machines, one or more knife arrangements cut the fish into fillets either by cutting from one side of the fish throughout the fish or by cutting partly from the abdomen side and partly from the spinal side of the fish. Most frequently, filleting machines are provided with one or more sets of two adjacent circular rotating saw blades. Obviously, the rotating saw blades perform a plan cut into the fish. In order not to loose too much fish meat, some machines are provided with a set of disks being arranged to form an angle therein between, so that the blades in one end defines a relatively open gab therein between and in a diametrically opposite end a relatively narrow gab therein between. In that way, the set of two blades can cut a triangular carcass part out of the fish relatively narrow to the backbone. However, mainly due to the fact that each blade performs a plan cut, relatively large amounts of the meat, especially in the abdomen part of the fish (the part extending downward from the backbone), is cut off from the valuable fillets and removed with the valueless carcass part.

New developments have generated machines using relatively flexible rotating band saws, i.e. closed-loop belts with a very sharp front edge. These belts are characterised by allowing cutting in slightly curved shapes. During the cutting, a fish is advanced in between two band saws. When the backbone has entered in between the two band saws, the two bands are pressed towards each other, e.g. by means of squeezing nippers. Due to a combination of the stiffness of the backbone and the angle of the knife edges of the bands, each of the bands will follow the backbone smoothly. The widest gab between the bands exists where the bands are held separated by the backbone. From this point, the bands, both upward towards the spine part and downward towards the abdomen part, follow a curve so that the gab between the bands, near the back of the fish and near the belly of the fish, is almost eliminated. The squeezing nippers are typically arranged above and below the fish (in close vicinity to the fish). Due to the curved configuration of the cutting bands, the cutting may be performed closely around the backbone and in a curve towards the centre plan of the fish. Accordingly, it is possibly with a band-saw machine to fillet the fish with a larger amount of the meat on the fillets.

However, even with the band-saw machines, a fair amount of meat is disposed with the carcass. The main reason being that the two band saws can not be pressed closer together than the width of the spine of the fish.

GB 973.213 describes a method and an apparatus for filleting fish, and wherein the fish, in particular herrings, is filleted by using firstly a rotating knife for cutting an incision in the spine part of the fish. Then the side fillets are cut away from the carcass by use of two oppositely arranged band saws. However, this single knife can only be used for fish having hair-like fishbone in the spine part. The way of using only one knife does not allow for cutting the fillets free on both side of fishbone in the spine part, which is necessary when filleting fish with large, thick and stiff fishbone in the spine part, such as Salmonidae or Gadidae. Further, it is not possible to cut away the dorsal fin from the spine part by using one knife, as the bone of fin extending in to the spine part must be cut on each side in order to remove it from the fillet.

U.S. Pat. No. 4,534,085, U.S. Pat. No. 3,596,308 and WO 94/17670 all relates to apparatuses, wherein the fish is filleted by use of two oppositely arranged band saws cutting the fillets on each side of the carcass.

U.S. Pat. No. 2,479,010 discloses a filleting machine, wherein the head and tail is removed first, and the fillets are then cut away by use of two rotating knives.

GB 811.199 discloses an apparatus, wherein the fillets are removed from the carcass by use of two rotating knives positioned just above the fish, which is transported on a conveyor.

DESCRIPTION OF THE INVENTION

It is an object of the present invention to provide a filleting machine that fillets fishes with a minimum of waste meat, in particular fishes with large and robust fishbone in the spine part, such as Salmonidae and Gadidae.

It is a further object of the present invention to provide a filleting machine with is easy to maintain.

The present invention overcomes the above-described disadvantages of the known fish-cutting machines by providing a fish-cutting machine for cutting fillets from the backbone of fish, the machine comprising:

a feed-line for feeding fish through the machine, two mutually adjacent band saws arranged along said feed-line, and which function to cut on respective sides of the backbone of a fish for filleting the abdomen-bone part of the fish and thus for separating the fish into two fish fillets and a carcass, and spine cutting means arranged along said feed-line and before the band saws in a feeding direction of the feed-line, the spine cutting means comprising two mutually adjacent cutting blades for cutting of incisions in the spine part of the fish.

Due to the arrangement of spine cutting means prior to the mutually adjacent band saws, it is possible to fillet fish in a two step process, wherein the spine part of the fish is firstly provided with incisions extending longitudinally from the spine to the backbone of the fish and preferably on each side of a line of vertical bones in the spine part and preferably in close vicinity of the head or neck part of the fish to the tail part of the fish. By using the spine cutting means it is possible to remove the fishbone in the spine part from the fillet and at the same time removing as little as possible of the fillet, thus minimising the waste product as much as possible. The use of two cutting blades allows filleting of the type of fish having a thick and large fishbone in the spine part (e.g. salmon and cod), as each of the cutting blade then can cut an incision on each side of the fishbone extending from the backbone up towards the back of the fish, which is necessary in order to remove these fishbone, including the dorsal fin, from the fillets.

The distance between the two cutting blades may be adjusted e.g. during operation of the machine.

Subsequently, the fillets are cut off from the backbone by means of the band saws cutting an incision from the abdomen part of the fish to the region of the backbone. Since the band saws are only used for cutting of the abdomen side of the fillet and not for cutting of the spine part of the fish, the bands are only going to be squeezed into a curvature which matches the curvature of the abdomen part of the fillet. At the spine part of the fillet, the bands may follow any curve, since this part of the fillet has already been cut by means of the spine cutting means. Accordingly, the band saws can be curved into a shape, which is more optimal for cutting off the meat from abdomen side of the fillet, and therefore a higher percentage of meat can be cut off from the carcass part and be sold with the fillets.

The band saw may be shaped such that the cutting edge is constantly distanced from the backbone of the fish. This may be achieved by providing a blade with a curved outer surface with an increasing thickness from the upstream front-edge towards the downstream rear-edge.

In connection to the spine cutting means may be provided means for maintaining the spine part of the fish in a desired position in relation to the cutting blade(s). The latter means may be plates adapted to press the sides of the fish in the desired position so as to ensure that the cutting blade cut away the spine part.

The cutting blades may be circular cutting blades adapted to cut during rotation around a rotation axis. The cutting blades may rotate clockwise or counter clockwise. The cutting blades may in another embodiment be knifes such as oscillating knifes. The cutting blades may be made of a metal such as stainless steel and aluminum.

Besides the cutting of the incisions, the cutting blades also guide the fish through the machine during the cutting process, so that the incisions made by the band saws are provided in a precise distance from the backbone. This guidance is achieved as the vertical fishbone of the spine part is fixed in between the two cutting blades and thus the fish cannot move to the sides.

Further, the incisions provided by the cutting blades are used as "track" for the succeeding fish-separating means.

Preferably, each cutting blade is fixed mounted to the axle, and a separate grinding machine may be provided for grinding the cutting blades. Said grinding machine comprises an identical hub for receiving and suspending said axle, as in the filleting machine. Thus, the blade edges are ground with the correct angle in relation to its suspension in the filleting machine and thus with the optimum cutting angle for cutting the fish. This provides an easy and simple way of maintaining the machine.

The cutting blades may be arranged mutually rotated an angle in the order of 0.6 degrees around a first axis, but could also be arranged 0.1 degree or 0.2 degree or 0.3 degree or 0.4 degree or 0.5 degree or 0.7 degree or 0.8 degree or 0.9 degree or 1.0 degree or 1.5 degree or 2 degrees or 3 degrees or 5 degrees or 10 degrees around a first axis.

The cutting blades may be arranged mutually rotated an angle in the order of 0.6 degrees around a second axis, but could also be arranged 0.1 degree or 0.2 degree or 0.3 degree or 0.4 degree or 0.5 degree or 0.7 degree or 0.8 degree or 0.9 degree or 1.0 degree or 1.5 degree or 2 degrees or 3 degrees or 5 degrees or 10 degrees around a second axis. The cutting blades may be arranged mutually parallel.

The blades may be provided with radially extending groves or holes. The groves may define a straight line but could also define a curve such as an S-curve. The aim of the groves may be to spread water applied to the surface of the cutting blades in different directions so as to reduce the friction between the fish and the sides of the cutting blades and/or the friction between the fish and the sides of the fish-separating means.

The spine cutting means may be arranged pivotally around an axis perpendicular to the rotation axis of the blades. The spine cutting means may be provided with means adapted to lock the means in any position around the axis, thus it may be possible to turn the spine cutting means in a position where removal and/or replacement of the spine cutting means is possible. Thus, it is very easy to take them out for grinding.

The spine cutting means may be provided with means such that the cutting blades and/or the shaft on which it is provided may be removable e.g. the spine cutting means may be provided with a lock for locking the shaft in a desired position.

Furthermore the fish-separating means may be arranged in the feeding direction after the spine cutting means so as to enter the incision(s) for separating the fillets of the fish during cutting with the band saws.

The fish-separating means may comprise a fish-separating blade with a cutting front-edge arranged upstream in the feeding direction for cutting the tail part of the fish. The blade may be fixed in the same position but could also be rotatable. In the sides of the blade may be provided holes for applying water or another form of liquid so as to reduce the friction between the fillet and the blade. The upper surface of the fish-separating blade may be provided with a cutting edge so as to cut the last five to ten millimeters of meat closest to the bone of the fish.

The fish-separating blade may be formed with a curved outer surface with an increasing thickness from the upstream front-edge towards the downstream rear-edge. A liquid such as water may be sprayed up in-between the spine cutting means and the blade so as to reduce the friction between the blade and the fillet.

Furthermore, the fish-separating blade may be formed with a curved outer surface with an increasing thickness in a direction perpendicular to the feeding direction from a sharp upper edge to a wider lower edge. The curved outer surface may be circular such the distance between the cutting edge of the cutting blades and the curved surface is substantially the same. The curved outer surface may also be s-shaped or any other shape.

The fish-separating means and the pressing means provides that the part of meat closest to the backbone is squeezed outwards during the transport there through, so that the band saws are able to also cut away that part of meat. A cut very close to the backbone is obtained and thus with a minimum of waste meat.

The fish-separating blade may extend forwardly along an upper edge thereof for the defining of a cutting sword tip.

Furthermore, the fish-cutting machine may comprise a fish supporting inlet with a supporting surface adapted to support the fish during entrance into the feed-line in a position in relation to the spine cutting means wherein the distance between the backbone and the axis of rotation of the spine cutting means is substantially constant for various fish of the same species. The fish supporting inlet may have a curved surface and may be provided with dynamic adjustment means e.g. a spring, which constantly ensures that the fish supporting means apply a desired pressure to the sides of the fish.

The feed-line may comprise a feed belt, the feed belt being arranged in a distance from the supporting surface, substantially, in the range of an average distance from the backbone to the spine for a fish species. The feed belt may be provided with engagement means such as spikes, adapted to engage at least a part of the sides of the fish. The feed-line may be provided such that it does not cover the abdomen part of the fish. Thus, fillet pressing means may press the sides of the fish towards each other so as to allow cutting away the bones in the abdomen part of the fish. The abdomen parts of the fish may be pressed towards a support plate arranged substantially in the middle of the feed line. The two incisions provided in the spine part is important in relation to pressing the abdomen part of the fish, as the incisions ensure that it is possible to press the abdomen part inwards as the meat of the back part has been slotted.

Preferably, the machine comprises guiding means for guiding predetermined parts of the fish away from said band saws, so as to maintain said part to the fillet(s). In particular, the layer of fat located in the lower part/edge of the fillet may preferably be kept on the fillet for later smoking of the fillet or for other special products. The guiding means may comprise an adjustable steel plate, which may be arranged on an upper part of said support plate of the fillet pressing means just before the band saws in the feeding direction. The steel plate ensures that the layer of fat is guided round the band saws.

The machine may further comprise grinding means for grinding the band saws and/or spine cutting means during operation of the machine. Preferably, the grinding means is grindstone that may be pushed towards the cutting edge of the band saw and spine cutting means, respectively, for grinding these while they are running.

The machine may comprise a compressor for activating the fillet pressing means, the shape forming means and grinding means by air pressure. The means for tensioning the band saws could also be activated by air pressure.

According to a second aspect, the invention relates to a method of filleting a fish, said method comprising the steps of:

performing at least two first substantially planar incisions from the spinal side of the fish and substantially to the backbone of the fish in the spine part of the fish, and performing second substantially curved incisions from the abdomen side of the fish and substantially to the backbone of the fish.

The method may also be used to separate bone in meet from the meat itself such as meat of pork and/or lamb and/or beef and/or poultry e.g. chicken or turkey or duck.

The first incision may be performed with a rotating circular blade but could also be performed with a knife or an oscillating knife. The second incision may be performed with a band-saw.

The method according to the second aspect of the invention may further comprise the constant positioning of the fish in relation to the rotating circular blade so as to maintain a substantially constant distance from the backbone of the fish to a cutting edge of said rotating circular blade.

The method may further comprise the step of pressing at least a part of each fillet of the fish towards each other so as to enable performing the second substantially curved incision.

The method may further comprise the step of guiding a predetermined part of the fish away from the band saws to as to maintain said part to the fillet after cutting.

The first incision(s) is preferably provided on each side of a line of vertical fishbone of the spine part.

The method according to the second aspect of the invention may be carried by the use of a machine according to the first aspect and thus comprise any features mentioned in connection therewith.

Preferred embodiments of the invention will now be described in detail with reference to the drawing in which.

DETAILED DESCRIPTION OF THE INVENTION

Figure 1:
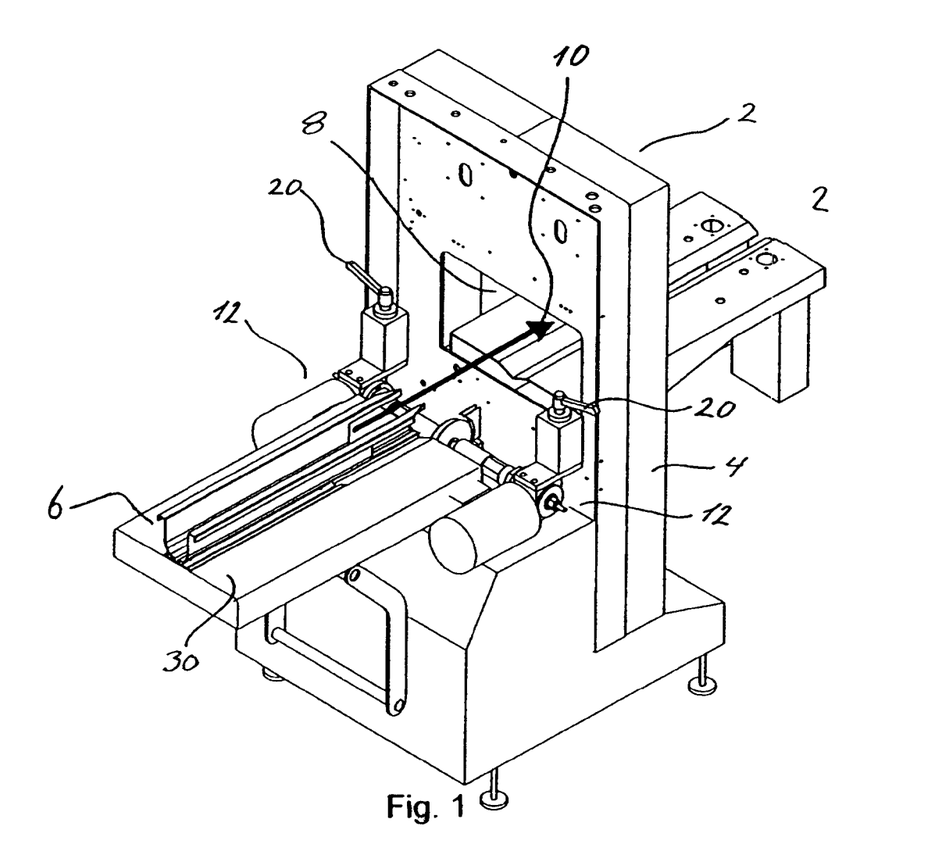
FIG. 1 shows a preferred embodiment of a cutting machine according to the present invention.

Referring to FIG. 1, the present invention relates to a cutting machine 2 comprising a housing 4 and a fish support 6. During the cutting operation, the fish is guided through the machine via a feed-line extending through the opening 8 in the direction visualised by the arrow 10. In the beginning of the feed-line, after the fish support 6, two spine cutting means 12 in the form of rotating circular cutting blades 14 are arranged for cutting incisions in the spine part of the fish. The circular saws are arranged pivotally around an axle of rotation 16 extending through a stand 18, which is pivotally connected to the housing 4.

Figure 2:
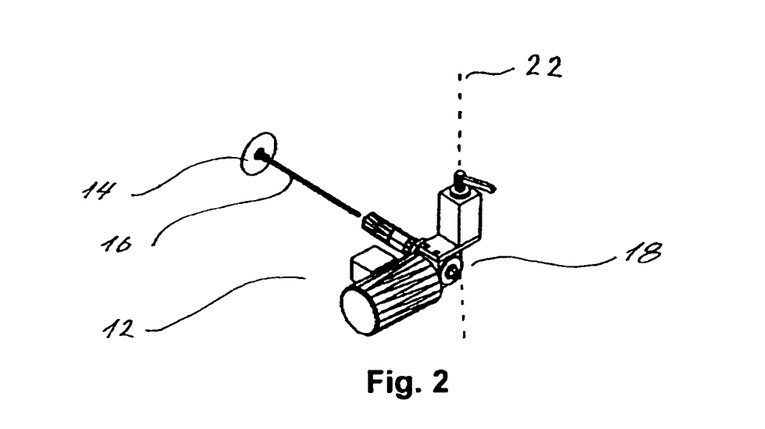
FIG. 2 shows spine cutting means according to the present invention.

FIG. 2 shows the spine cutting means 12 comprising the rotating circular blades 14 arranged pivotally around the hinge pin 16. The hinge pin 16 extends through the stand 18. A handle 20 may be positioned in a locking position or an unlocking position. When the handle 20 is in its unlocking position, the stand 18 may be rotated around an axis of rotation 22.

Figure 3:
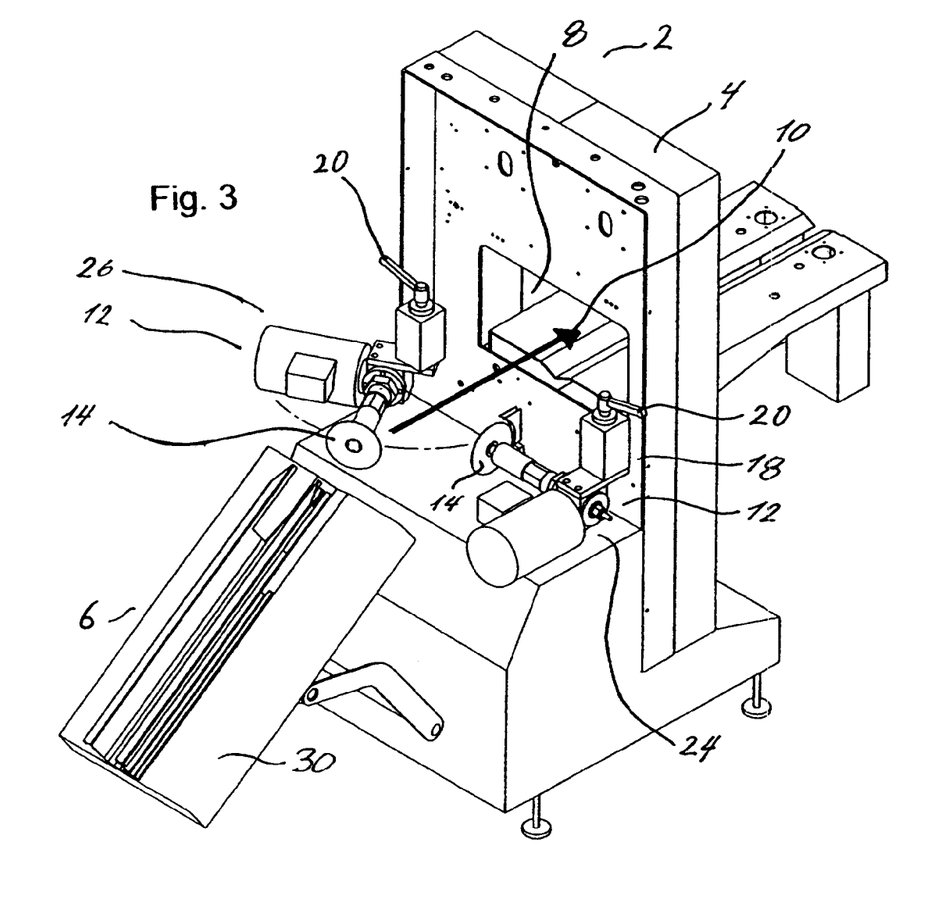
FIG. 3 shows the machine of FIG. 1, in a state for inspection and maintenance.

In FIG. 3, the spine cutting means are provided, one is in an operating position 24 and one is in a maintenance position 26. Furthermore, FIG. 3 shows that the stand 30 is pivotally arranged. When the stand 30 is pivoted downwards, the machine 2, and in particular the spine cutting means 12, may easily be cleaned, inspected or ground. When the stand 30 is pivoted downward, the circular blades may be pivoted outwards to the maintenance position 26 so that the saw blade can be changed.

Figure 4:
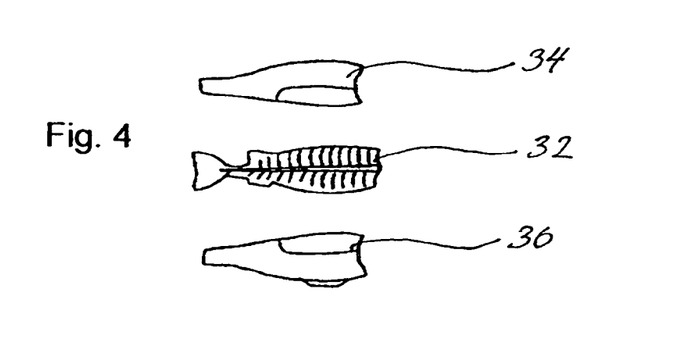
FIG. 4 shows a fish filleted on the machine according to the present invention.

The support 6 is provided to support fish of various sizes in a substantially fixed height in relation to the spine cutting means. Thereby, it is achieved that the spine cutting means cuts in the same depth from the back of the fish to the backbone of the fish irrespective of the size of the fish. FIG. 4 shows a fish after processing in the filleting machine 2. The fish has been separated into a carcass (backbone and spine part) 32 and two fillets 34, 36 i.e. a right side fillet 34 and a left side fillet 36.

Figure 5:
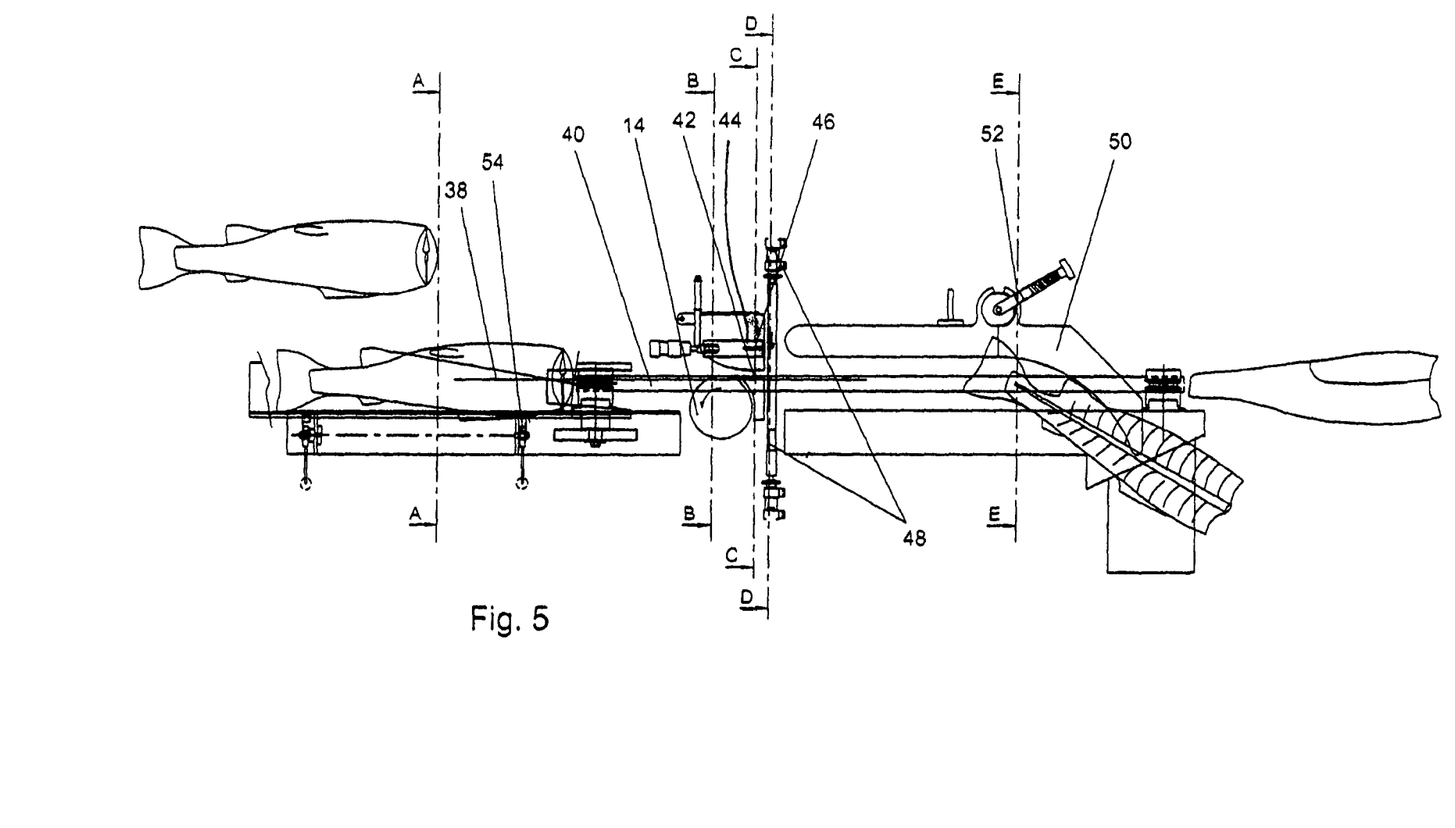
FIGS. 5–6 show a side view of the cutting machine according to the present invention.
Figure 6:
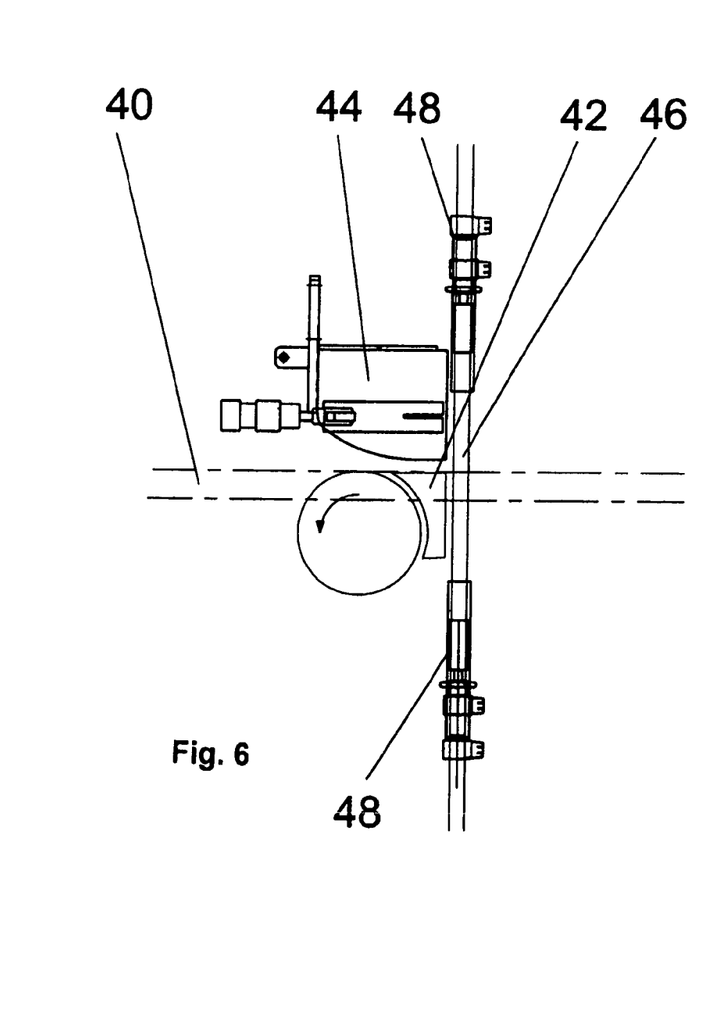
Figure 8:
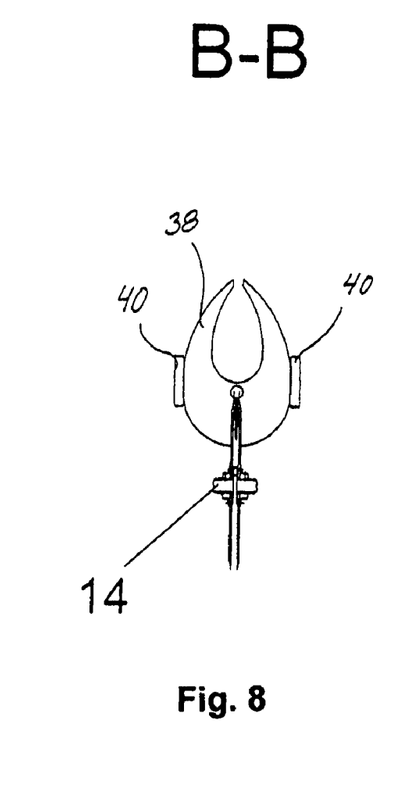
Figure 9:
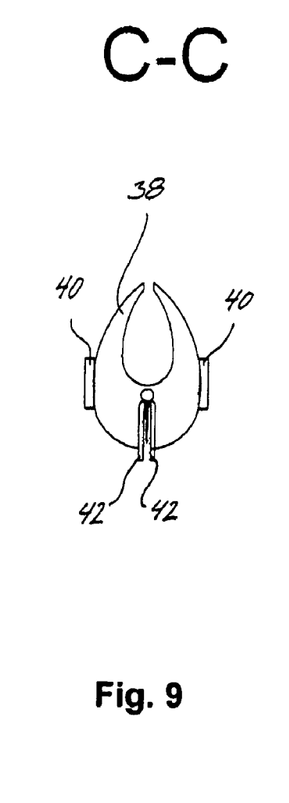
Figure 12:
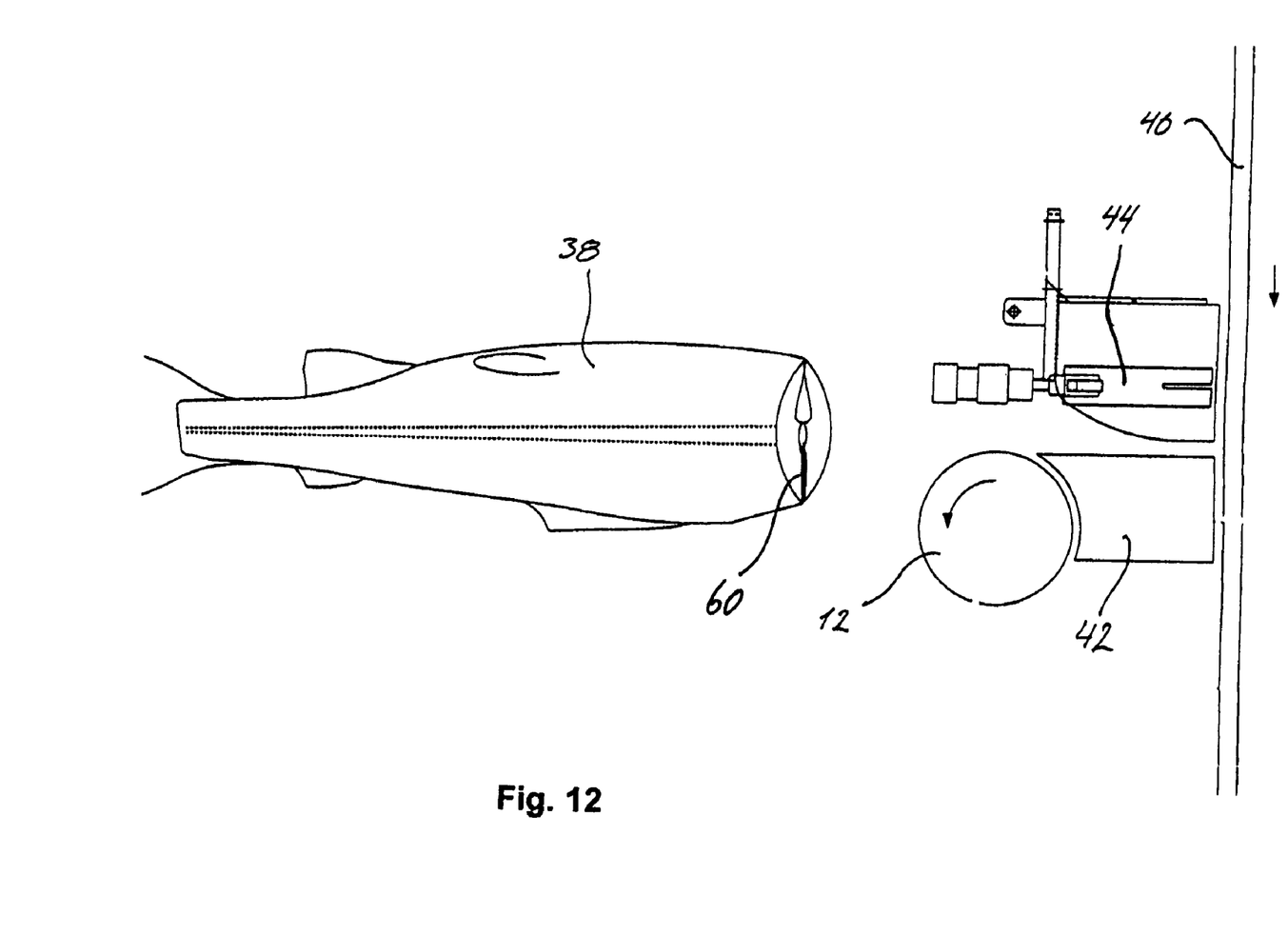
FIG. 12 shows a principal side view of the cutting machine according to the present invention.
Figure 14:
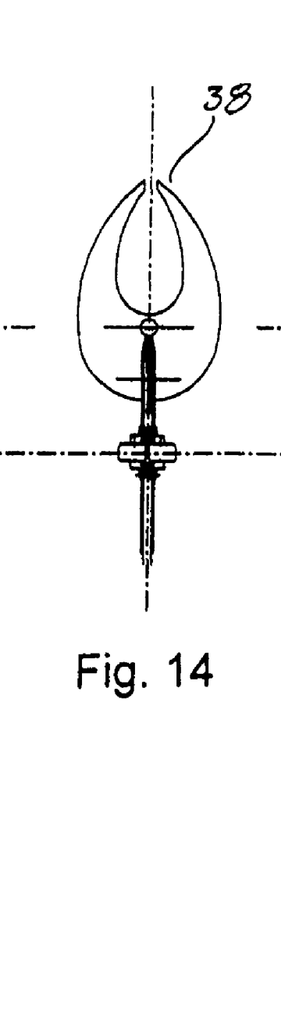
Figure 17:
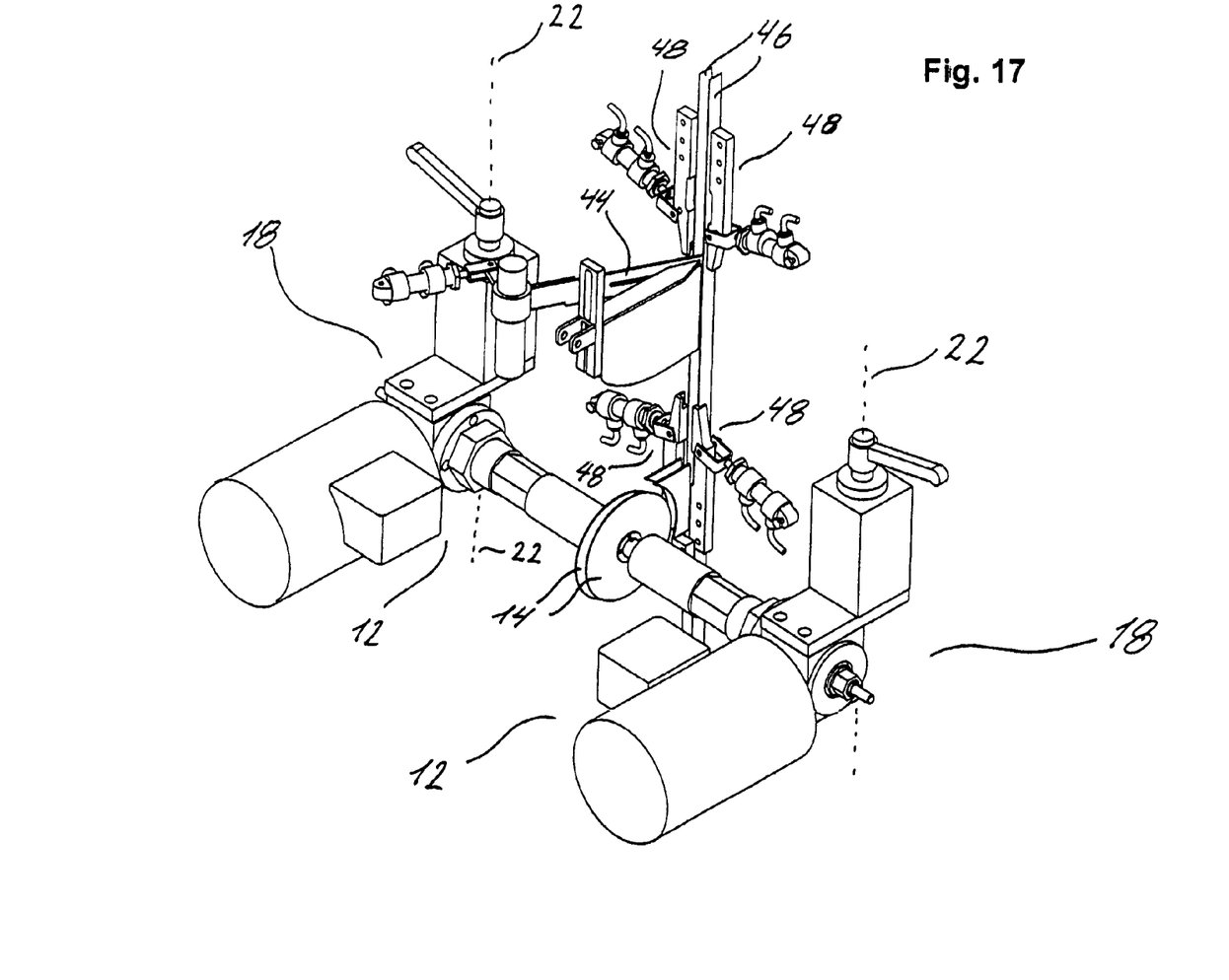
FIGS. 17–18 show tree-dimensional views of the fish filleting machine.
Figure 18:
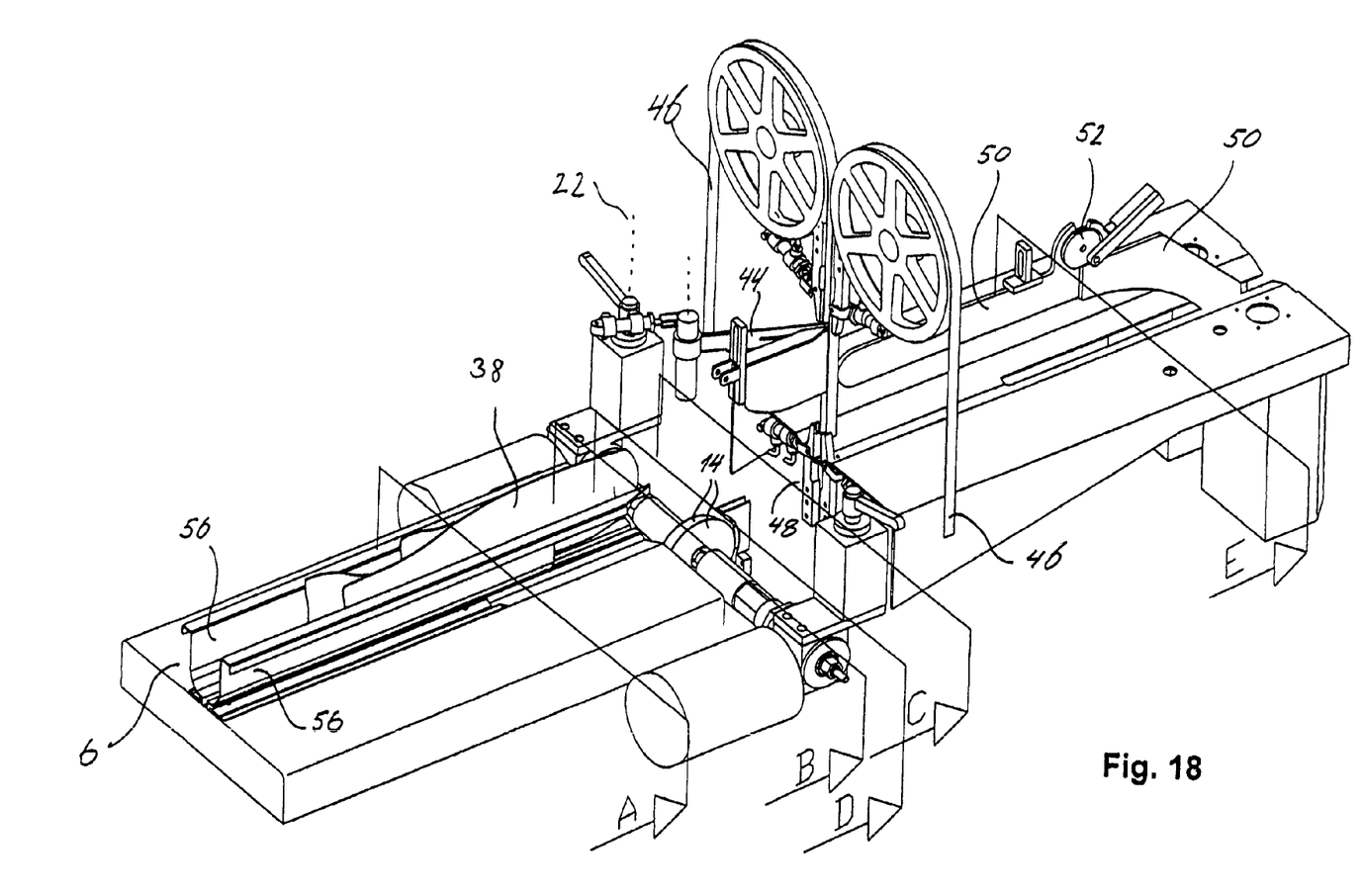

FIGS. 5, 6 and 12 show a side view of the filleting machine according to the present invention. FIGS. 17–18 disclose the filleting machine in a tree-dimensional view. In the figures the housing 4 is not shown. A fish 38 is placed in the fish support 6 (the fish support 6 is not shown) and a feed-line 40 feeds the fish through the machine. The circular blades 14 cut free the spine part of the fish from the fishbone 60, which prior to being fed to the machine has had the head removed. A different view of the circular blades cutting free the spine part is shown in FIGS. 8 and 14. The circular blades are provided with an angle of 1.2 degrees in relation to each other in the plane defined by the feed-line of the machine, i.e. in the horizontal plane. In the vertical plane the circular saws define an angle of 0.6 degree so as to cut close to the vertical bones in the spine part of the fish.

Downstream in relation to the circular saws 14 is placed a fish separating blade 42, adapted to separate the two sides of the fish which have been provided by cutting free the spine part of the fish. The upper edge of the fish separating blade is provided with a cutting edge so at to cut the last five to ten millimeters of meat closest to the bone of the fish. Above the fish separating blade 42 is provided abdomen-pressing means 44 which is adapted to press the abdomen part of the right and left side of fish towards each other so as to enable cutting away bones in the abdomen part of the fish. The abdomen parts of the fish are pressed towards a support plate 58 arranged substantially in the middle of the feed line.

The bones in the abdomen part of the fish are cut away by means of two mutually adjacent band saws 46. Each of the two adjacent band saws 46 are provided with shape forming means 48 being adapted to form the band saws in a desired shape. During operation, the shape-forming means 48 apply pressure to the band saws 46 so that they are pressed against the bones in the abdomen part of the fish, thus as much of the meat in the abdomen part as possible is cut away from the bone part. The band saws are provided 0.4 millimeters away from a horizontal line being a tangent to the part of the abdomen-pressing means being the closest to the fish. The band saws define an angle of 0.5 degree in relation to said horizontal line.

A carcass separating means 50 is provided downstream after the band saws 46. Said separating means ensure that the carcass is directed downwards and that the fillets 34, 36 continue in the horizontal direction. A coupling mechanism 52 is provided such that, if the carcass is not completely separated from the fillets, the curved part of the separating means 50 will rotate upwards so as to ensure that the fillets 34, 36 and the carcass 32 is not stuck in the machine.

Figure 7:
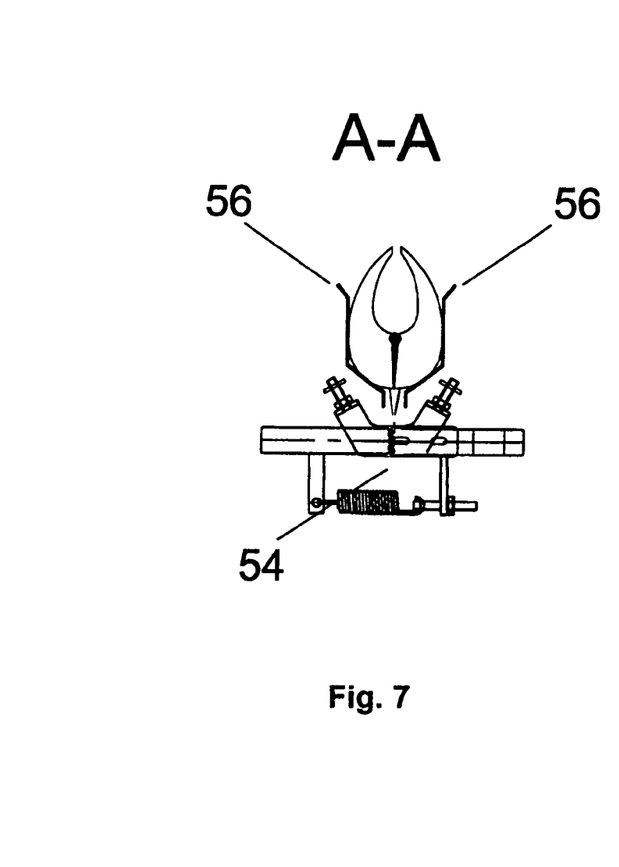
FIGS. 7–11 show cross sectional views relating to the cross sections shown in FIG. 5.

FIG. 7 shows the fish support 6 comprising means for centering the fish 54. The fish supporting means 6 comprises sides 56, which are pressed against the sides of the fish.

Figure 10:
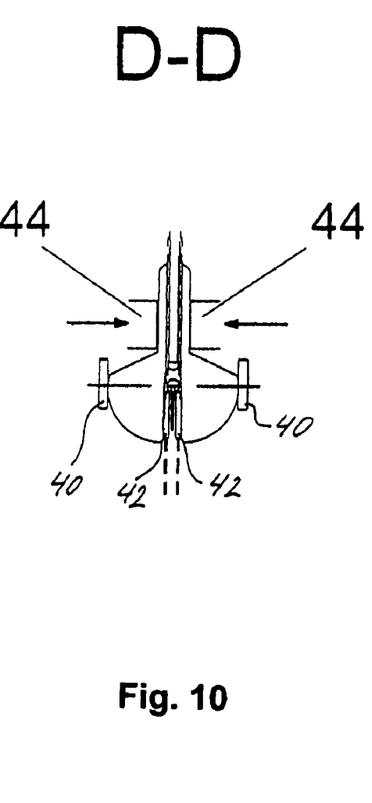
Figure 11:
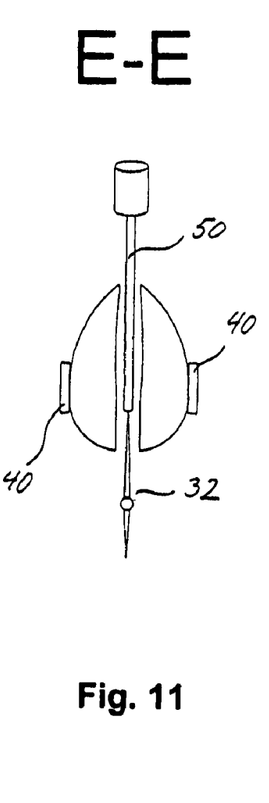
Figure 13:
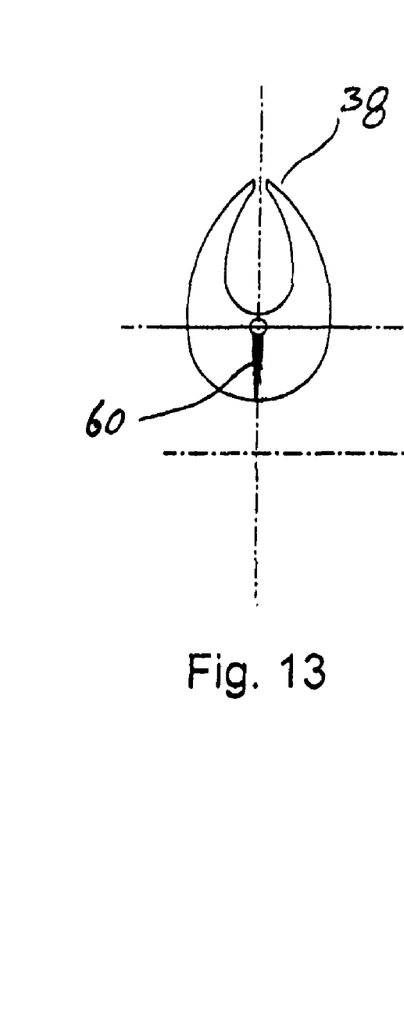
FIGS. 13–16 show a cross-sectional view of a fish prior to entering the machine, in the machine, and after processing in the machine
Figure 15:
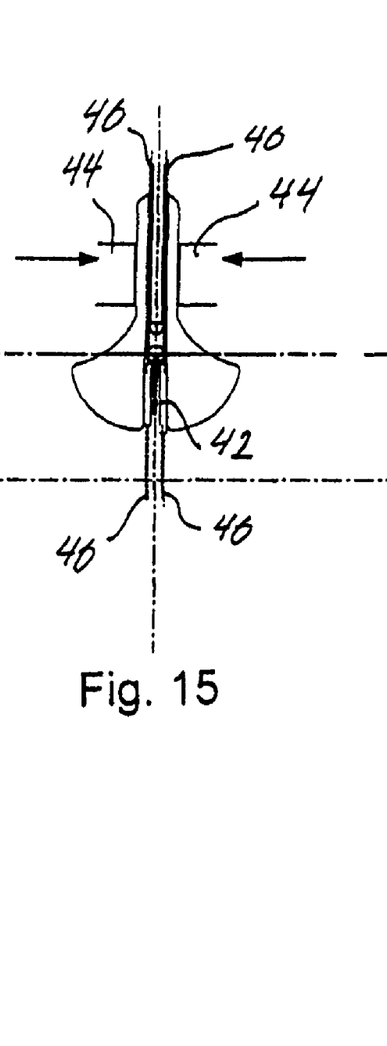
Figure 16:
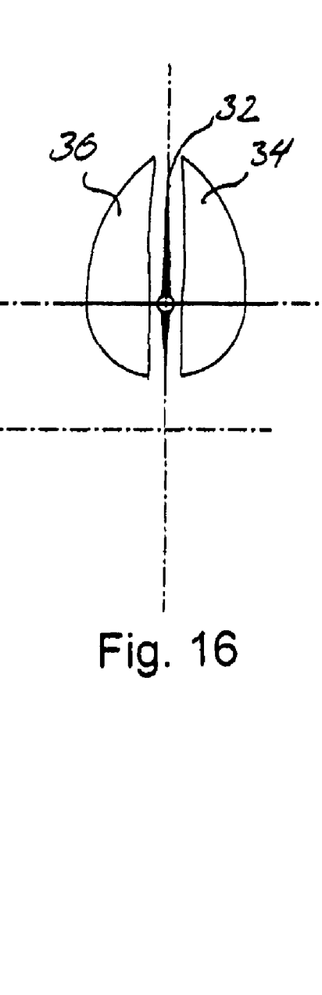

FIG. 8 and FIG. 14 show the circular blades 14 cutting the spine part of the fish. FIG. 10 and FIG. 15 show the separating blade 42 separating the fillets while the band saws 46 cut the fillet, while the abdomen-pressing means 44 press the sides of the fillet together. FIG. 13 shows a cross-section of the fish prior to entering the machine and FIG. 16 shows the fish after exit of the machine.

Figure 19:
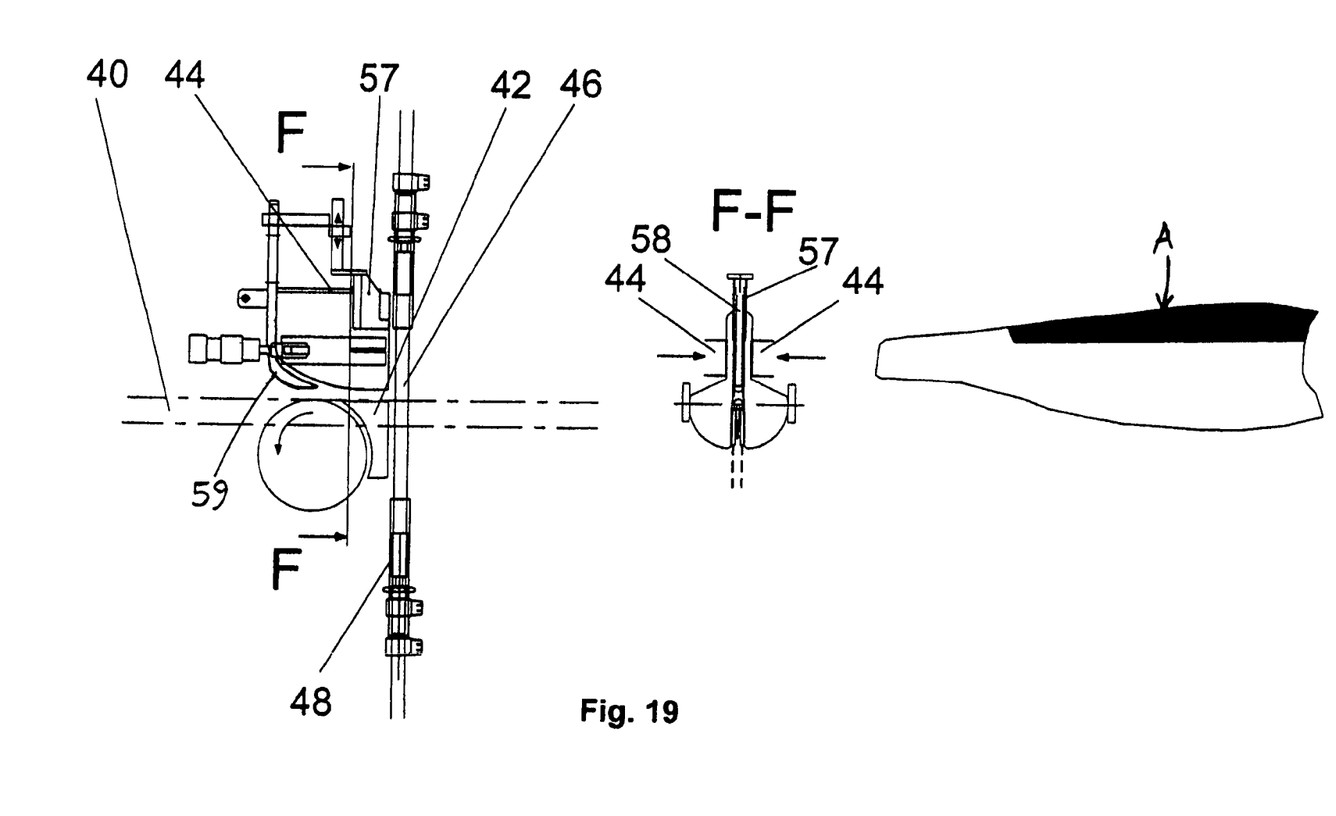
FIG. 19 shows a part of the machine comprising guiding means for guiding a part of the fish round the band saws.

FIG. 19 shows a part of the machine comprising guiding means 57 for guiding a part (black part A) of the fish round the band saws 46. The guiding means 57 comprises a steel plate positioned over an upper part of the support plate 58 which functions as support for the fillets when these are pressed by the fillet pressing means 44.

Just in front of the support plate 58 is positioned a cutting member 59 having a cutting edge. It may happen that the fish has not been slotted up entirely from the anus and up to the tail before is enters the filleting machine, and therefore this cutting member 59 ensures that this non-slotted part of the fish is slotted when the fish passes the cutting member 59.

What is claimed is:

1. A fish-cutting machine for cutting fillets from the backbone of fish, the machine comprising:
    a feed-line for feeding fish through the machine,
    two mutually adjacent band saws arranged along said feed-line, and which function to cut on respective sides of the backbone of a fish for filleting the abdomen-bone part of the fish and thus for separating the fish into two fish fillets and a carcass,
    spine cutting means arranged along said feed-line and before the band saws in a feeding direction of the feed-line, the spine cutting means comprising two mutually adjacent cutting blades for cutting of incisions in the spine part of the fish, and
    fish-separating means arranged in the feeding direction after the spine cutting means and before the band saws so as to enter the incisions for separating the fillets of the fish during cutting with said band saw.

2. A machine according to claim 1, wherein the cutting blades are circular cutting blades adapted to cut during rotation around a rotation axis.

3. A machine according to claim 1, wherein the cutting blades are arranged mutually rotated an angle in the order of 0.6 degrees around a first axis.

4. A machine according to claim 1, wherein the cutting blades are arranged mutually rotated an angle in the order of 0.6 degrees around a second axis.

5. A machine according to claim 1, wherein the cutting blades are arranged mutually parallel.

6. A machine according to claim 1, wherein the blades are provided with radially extending grooves.

7. A machine according to claim 1, wherein the spine cutting means are arranged pivotally around an axis perpendicular to the rotation axis of the blades.

8. A machine according to claim 1, wherein the fish-separating means comprises a fish-separating blade with a cutting front-edge arranged upstream in the feeding direction for cutting the tail part of the fish.

9. A machine according to claim 1, wherein the fish-separating means is formed with a curved outer surface with an increasing thickness from the upstream front-edge towards the downstream rear-edge.

10. A machine according to claim 1, wherein the fish-separating means is formed with a curved outer surface with an increasing thickness in a direction perpendicular to the feeding direction from a sharp upper edge to a wider lower edge.

11. A machine according to claim 8, wherein the fish separating blade extends forwardly along an upper edge thereof for the defining of a cutting sword tip.

12. A machine according to claim 1, further comprising a fish supporting inlet with a supporting surface adapted to support the fish during entrance into the feed-line in a position in relation to the spine cutting means wherein the distance between the backbone and the axis of rotation is substantially constant for various fish of the same species.

13. A machine according to claim 1, further comprising fillet pressing means adapted to press at least a part of the fish fillet into a desired position.

14. A machine according to claim 1, wherein the feed-line comprises a feed belt, the feed belt being arranged in a distance from a supporting surface substantially in the range of an average distance from the backbone to the spine for a fish species.

15. A machine according to claim 1, further comprising shape forming means adapted to shape at least a part of the band saw into a desired shape and/or position.

16. A machine according to claim 1, further comprising guiding means for guiding predetermined parts of the fish away from said band saws, so as to maintain said part to the fillet(s).

17. A machine according to claim 16, wherein the guiding means are arranged between fillet pressing means just before the band saws in the feeding direction.

18. A machine according to claim 1, further comprising grinding means for grinding the band saws and/or spine cutting means during operation of the machine.

19. A machine according to claim 1, further comprising a compressor for activating fillet pressing means and/or shape forming means and/or grinding means by air pressure.

20. A machine according to claim 1, wherein the cutting blades are operable to cut on each side of a line of vertical fishbone of the spine part.

21. A machine according to claim 1, further comprising carcass separating means provided downstream of said band saws for ensuring that the carcass is entirely removed from the fillets.

22. A machine according to claim 21, wherein a coupling mechanism is provided for rotating the carcass separating means upwards so as to ensure that the fillets and the carcass is not stuck in the machine.

* * * * *